March 23, 1954 — W. A. BEDFORD, JR — 2,672,764
KNOB FASTENER
Filed June 15, 1950

INVENTOR:
WILLIAM A. BEDFORD JR.,
BY Robert E Ross
AGENT.

Patented Mar. 23, 1954

2,672,764

UNITED STATES PATENT OFFICE 2,672,764

KNOB FASTENER

William A. Bedford, Jr., North Scituate, Mass., assignor to United-Carr Fastener Corporation, Cambridge, Mass., a corporation of Massachusetts Application June 15, 1950, Serial No. 168,259

3 Claims. (Cl. 74—553)

This invention relates generally to fastening devices for use in knob assemblies and the like.

In the assembly of control knobs onto dash panels of automobiles and the like, for engagement with a push pull control rod, it is convenient to provide a cylindrical shank on the knob to enter a cylindrical opening in the panel for longitudinal movement therein to operate the control rod. In many cases the dash panel is formed by die casting, and the knob is formed of either die cast metal or injection molded plastic. The use of such forming processes requires that the wall of the panel opening and the knob shank be tapered longitudinally to allow extraction of the article from the mold during the molding process. Consequently, it is impossible to obtain a close fit between the knob shank and the opening in both the in and out knob positions, which allows the knob shank to have a degree of lateral freedom of movement in the opening, and vibrations transmitted to the panel or control rod cause rattling of the knob in the opening.

The object of the invention is to provide a fastening device for a knob assembly or the like which is adapted to be assembled with the shank of a knob for frictional engagement with the walls of an opening into which the shank is assembled to prevent vibration of the knob in the opening.

A further object of the invention is to provide a knob assembly which is adapted to enter an opening in a panel, in which a knob having a shank with a longitudinal opening therein is provided with a fastener assembled in the opening which is adapted to circumferentially engage the walls of an opening into which the knob shank is assembled to prevent lateral movement of the shank in the opening.

A still further object of the invention is to provide a sheet metal fastening device in which a base is provided with two series of arms disposed thereabout for engagement with the walls of an opening, said series of arms being disposed on the base so that inward flexing of the arms of one series causes outward flexing of the arms of the other series.

Other objects of the invention will, in part, be obvious, and will, in part, appear hereinafter. For a fuller understanding of the nature and objects of the invention, reference should be had to the following detailed description, taken in conjunction with the accompanying drawing, in which.

Figure 1:
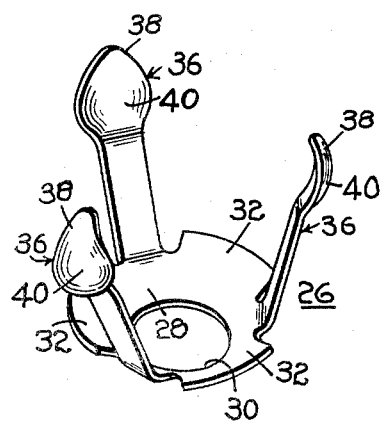
Fig. 1 is a perspective view of a fastener embodying the features of the invention.

Referring to the drawing, there is illustrated a knob assembly 10, for assembly into an opening 12 in a supporting panel 14 for engagement with a push-pull control rod 16. The knob assembly 10 comprises a knob member 18 which has a substantially cylindrical shank 20 having a cylindrical longitudinal opening 22 therein and a threaded opening 24 at the bottom thereof for engagement with the end of the rod 16, and a sheet metal fastener member 26 assembled in the opening 22.

The fastener 26 comprises generally a circular base 28 having a central opening 30 disposed therein to allow the rod 16 to pass therethrough, a series of outwardly extending tongues 32 disposed about the base for frictional engagement with the interior wall 34 of the shank 20, and a series of spring arms 36 extending generally upwardly from the outer periphery of the base, and having free ends 38 which extend out of the shank opening. The base 28 is preferably slightly conical, so that the tongues 32 extend slightly upwardly for inclined engagement with the wall 34. The tongues 32 and the spring arms 36 are spaced alternately and uniformly about the base, so that each spring arm is disposed between two adjacent tongues. The spring arms 36 are capable of radial flexing, and in the normal condition the free ends 38 are further apart than when assembled in the knob 18 so that after such assembly the arms bear against the inner wall 34 at the end of the shank 20. The free ends 38 are provided with outwardly rounded portions 40, which extend radially outwardly beyond the outer periphery of the end of the shank, and the portions 40 are also rounded radially for a purpose to be hereinafter described.

The supporting panel 14 may be a die cast dash panel of an automobile, and in the illustrated embodiment is provided with a cylindrical wall 42 extending to the rear of the panel forming the opening 12. The opening 12 has a slightly greater diameter at the entrance than at the bottom, thereby providing a longitudinal taper to the wall 42 to enable the molding die to be separated from the panel during manufacture thereof. Since the knob 18 is either die cast metal or molded plastic, it is also necessary to provide a longitudinal taper on the shank 20 for a similar reason, and consequently the end of the shank has a slightly smaller diameter than it has at the point where it joins the main body of the knob. The degree of taper of the knob shank 20 and the opening 12 in the panel may or may not be the same, depending on the material used and the method of manufacture. However, even if the taper is the same, although a close fit may be made between the knob shank and the wall 42 when the knob is in the full in position, when the knob is in the out position, there will be considerable clearance between the shank and the wall.

To assemble the fastener 26 in the shank opening 22, the base 28 of the fastener is forced into the opening so that the tongues 32 frictionally engage the interior wall 34 of the shank. The interior wall 34 may also be tapered longitudinally so that as the fastener is forced downwardly, the engaging pressure of the tongues against the wall 34 increases. After assembly of the fastener 26, the knob assembly 10 may then be assembled into the opening 12 in the panel by inserting the end of the shank 20 therein, so that the outwardly rounded portions 40 engage the wall 42 and flex slightly inwardly. The rod 16 extends from the rear of the panel into the opening 12, and may be provided with a threaded end 44. The knob is then attached to the rod 16 by screwing the end of the rod into the threaded opening 24 in the bottom of the shank opening.

The outwardly rounded portions 40 retain the end of the shank centered in the opening 12, and prevent any substantial lateral movement which would cause undesirable rattling or vibration. Since the portions 40 are also rounded radially, the edges thereof do not engage the wall 42, and consequently the knob assembly is permitted free in and out movement in the opening during operation of the control rod 16. During such operation, the spring arms expand and contract slightly to adjust to the taper of the shank wall 34, thereby keeping the end of the shank centered in the opening in all positions of the knob.

Inasmuch as the fastener 26 is formed of resilient sheet metal, when the base 28 is forced into the opening so that the tongues 32 engage the wall, the tongues 32 flex inwardly, which causes the arms 36 to tend to turn outwardly, thereby increasing the tension with which the outwardly rounded portions 40 engage the wall 34, and insuring that all three arms engage the wall with substantially uniform tension.

Figure 2:
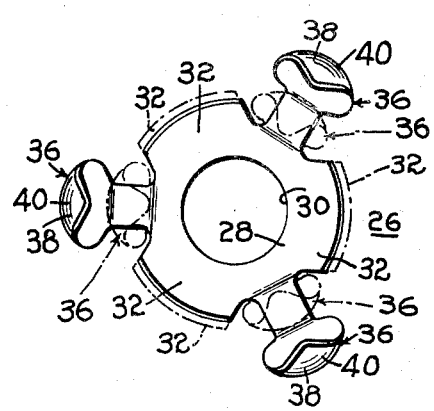
Fig. 2 is a top plan view of the fastener of Fig. 1 in which dot and dash lines illustrate the action of the engaging portions thereof.
Figure 4:
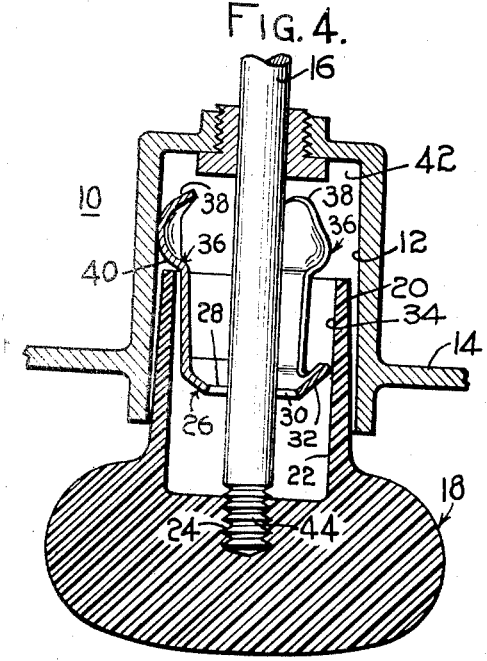
Fig. 4 is a view in elevation, partly in section, of the knob assembly of Fig. 3 assembled into an opening in a supporting panel.
Figure 3:
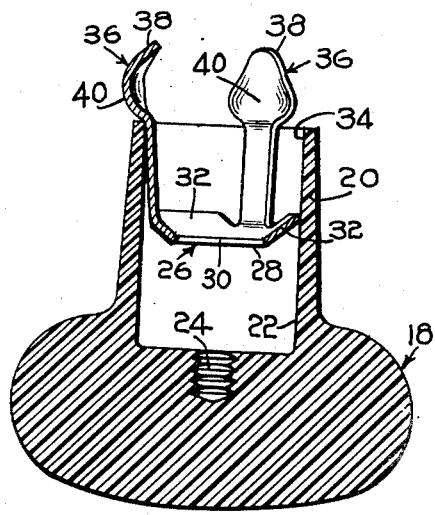
Fig. 3 is a view in elevation, partly in section, of a knob assembly having the fastener member of Fig. 1 assembled therein.

This action is best illustrated in Fig. 2 which shows the method of flexing of the fastener when the arms 36 are unconfined. The dashed lines show the position of the arms 36 and the tongues 32 before flexing, and the solid lines show the position after flexing.

Inward flexing of the tongues 32 as would occur by insertion into the opening 22, causes the arms 36 to flex outwardly. When the arms 36 are confined as when the device is assembled as hereinbefore described, and cannot flex outwardly, the result is to increase the force with which the arms bear against the wall of the opening.

Although the fastener and knob assembly of the invention are particularly useful where the construction involves tapered walls as described above, their use is not limited thereto, since they are equally useful when other forming operations not requiring tapers are used. Although the device has been described as it is used for knob assemblies on dash panels of automobiles, it may be used in any similar application.

Since certain other obvious modifications may be made in the device without departing from the scope of the invention, it is intended that all matter contained herein be interpreted in an illustrative and not in a limiting sense.

I claim:

1. A fastening device of the class described, said device comprising an annular base having a first series of resilient arms disposed about the periphery of the base for engagement with the walls of an opening into which said device may enter, and a second series of resilient arms extending from said base, the arms of each of said series extending from one side of the base and being inclined outwardly therefrom throughout their length, the arms of the second series being longer than the arms of the first series and being inclined to the plane of the base at a greater angle than the arms of the first series, the arms of said first series having abrupt ends for biting engagement with the wall of a housing opening into which the fastener is assembled, the arms of said second series having outwardly rounded spoon-shaped ends disposed beyond the edge of the base for sliding freely on the wall of a support into which the housing and fastener is to be assembled.

2. A fastening device for assembly into an opening for internal engagement therewith, said device comprising an annular base having an opening therein, a first series of resilient arms disposed about the outer periphery of the base for engagement with the walls of the opening, and a second series of resilient arms disposed about the outer periphery of the base, the arms of each series extending from one side of the base and being inclined outwardly therefrom throughout their length, the arms of said second series being interposed between adjacent arms of said first series and being longer and inclined to the base at a greater angle than the arms of said first series, the arms of said first series having abrupt ends for biting engagement with the wall of a housing opening into which the fastener is assembled, the arms of said second series having outwardly rounded spoon-shaped ends disposed beyond the edge of the base for sliding freely on the wall of a support into which the housing and fastener is to be assembled.

3. A knob assembly for insertion in a panel opening for longitudinal movement therein, said knob assembly comprising a knob member having a shank adapted to enter the opening, said shank having a longitudinal opening therein opening to the end thereof, and a fastener member assembled in the shank opening, said fastener member comprising a base having a central opening therein, a series of wall engaging resilient tongues disposed about the periphery of the base and extending outwardly therefrom and toward said end at an angle to the plane of the base for inclined engagement with the walls of the shank opening, and a series of spring arms disposed about the periphery of the base and extending upwardly therefrom, said spring arms having free ends extending out of the shank opening, said free ends having spoon-shaped portions disposed thereon which extend radially outwardly beyond the outer periphery of the end of the shank sufficiently far that when the assembly is inserted into a panel opening of proper size, the free ends of the arms are flexed inwardly by engagement with the walls of the panel opening so that the end of the shank is centered in the opening and said spoon-shaped portions are free to move longitudinally in sliding engagement with the walls of the panel opening.

WILLIAM A. BEDFORD, Jr.

References Cited in the file of this patent

UNITED STATES PATENTS

| Number | Name | Date |
|---|---|---|
| 1,400,155 | Greenburg | Dec. 13, 1921 |
| 1,482,660 | Overmyer | Feb. 5, 1924 |
| 1,987,035 | Tideman | Jan. 8, 1935 |
| 2,165,412 | Place | July 11, 1939 |
| 2,238,238 | Westrope | Apr. 15, 1941 |
| 2,249,381 | Gustafson | July 15, 1941 |
| 2,316,918 | Wallace | Apr. 20, 1943 |